UNITED STATES PATENT OFFICE.

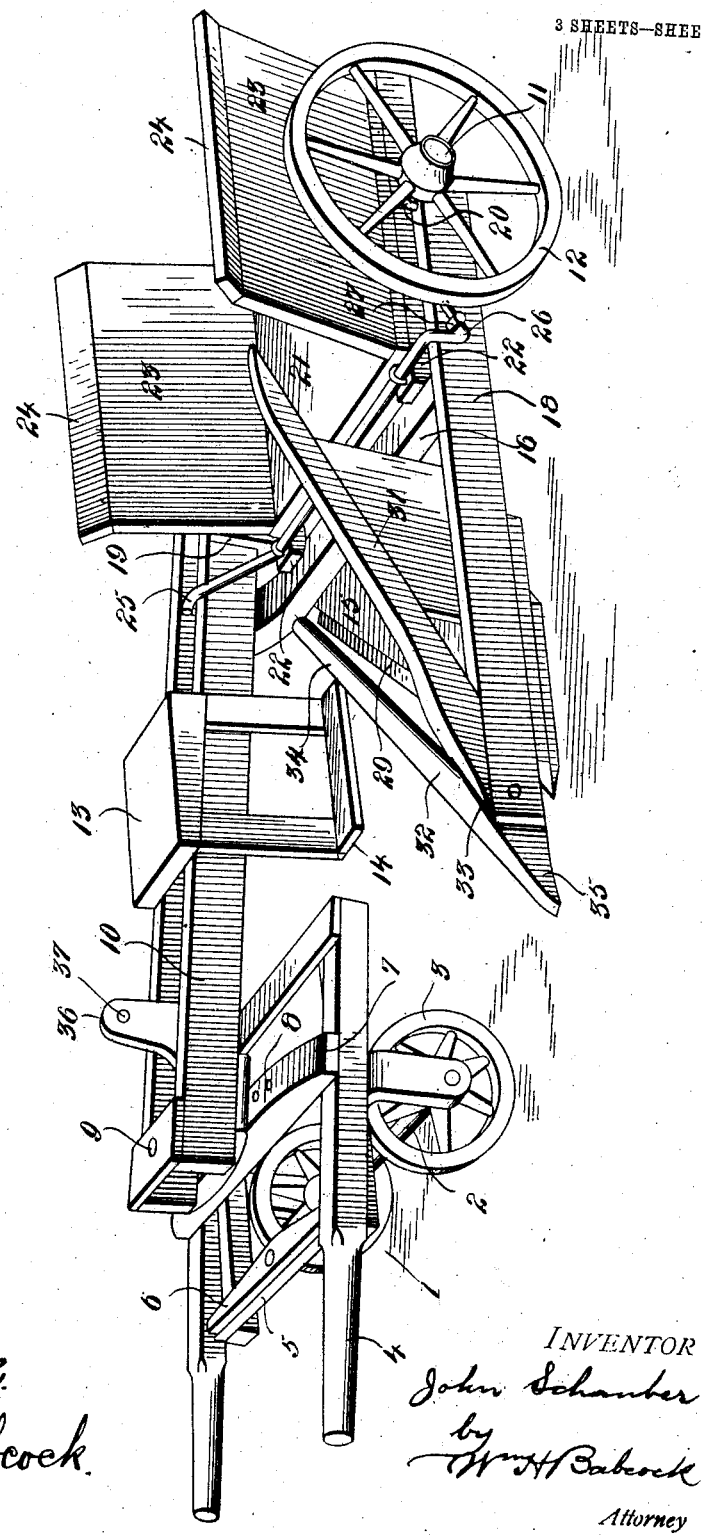

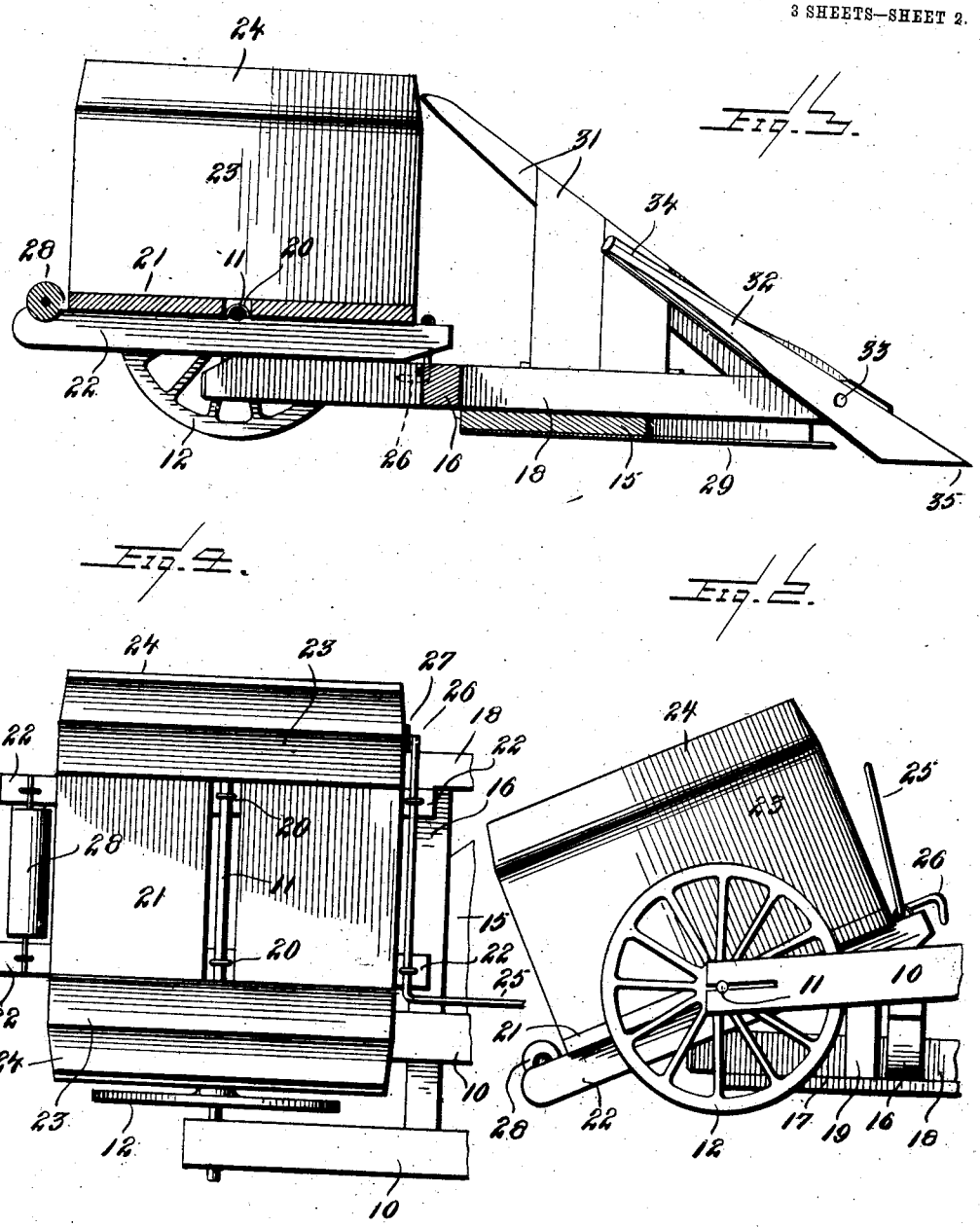

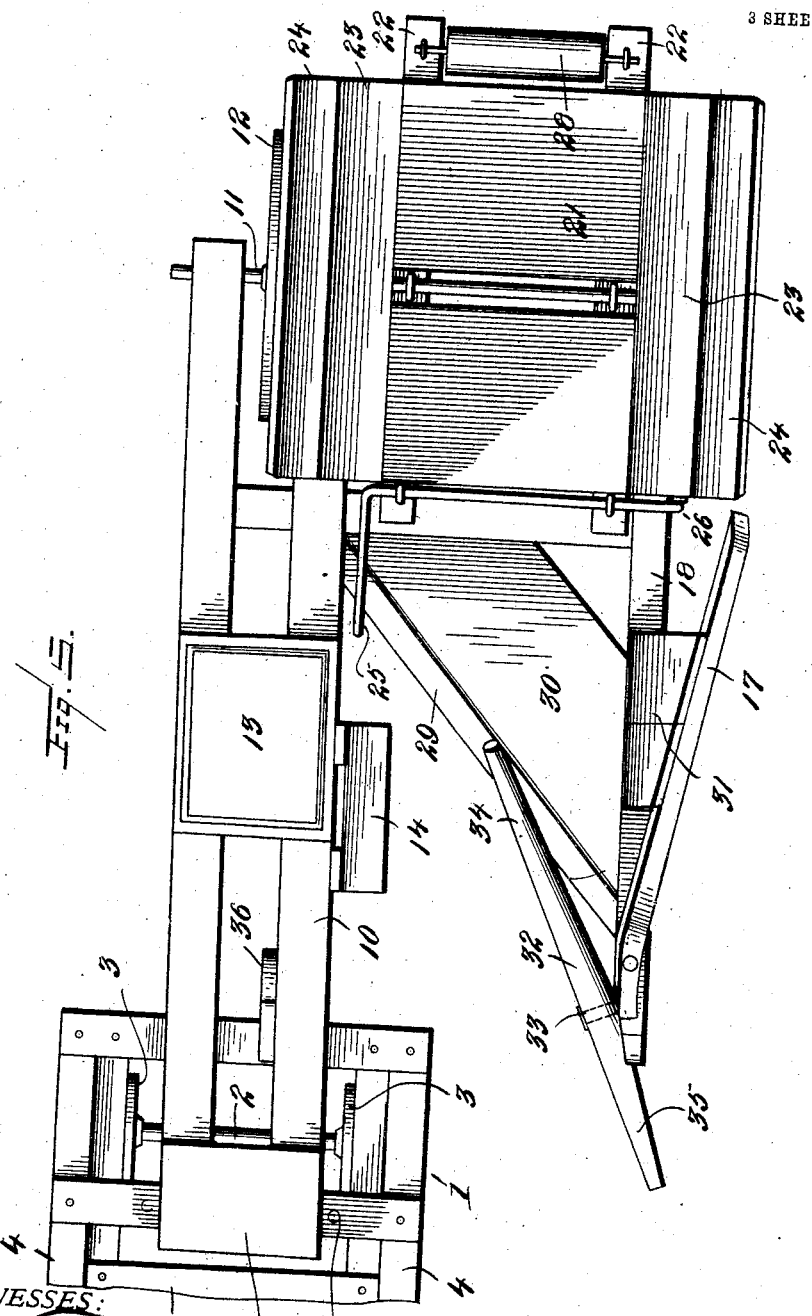

JOHN SCHAUBER, OF NEAR CHURCH HILL, MARYLAND.

CORN-CUTTING MACHINE.

No. 853,997.

Specification of Letters Patent.

Patented May 21, 1907.

Application filed December 3, 1906. Serial No. 346,041.

*To all whom it may concern:*

Be it known that I, JOHN SCHAUBER, a citizen of the United States, residing near Church Hill, in the county of Queen Anne and State of Maryland, have invented certain new and useful Improvements in Corn-Cutting Machines; and I do hereby declare the following to be a full, clear, and exact description of the invention, such as will enable others skilled in the art to which it appertains to make and use the same.

This invention relates to cutters and harvesters for corn, of the kind cutting the corn standing in the rows, by a blade drawn along above the surface of the ground, receiving the same, as cut, on a tilting platform and dumping it behind the machine.

The object of said invention is to produce a simpler, more reliable and more durable machine for such purposes than those hitherto known and to enable it to operate satisfactorily and automatically without stopping.

To this end the invention consists in the construction and combination of parts, and in certain improvements in details, hereinafter more particularly set forth and claimed.

In the accompanying drawing, Figure 1 represents a perspective view of the machine in its normal position; Fig. 2 represents a side elevation of the cart or platform, tilted for dumping, and the proximate parts; Fig. 3 represents a central longitudinal section of the machine, omitting the draft truck and looking away from the driver's seat; Fig. 4 represents a plan of the tilting platform and attachments. Fig. 5 represents a plan view illustrating more distinctly the outwardly inclined tip or point 35 and the outwardly inclined rear part of the deflector.

The draft-truck designated by 1 is mounted on the axle 2 of a pair of wheels 3 and has a pair of shafts 4 attached to it. A bar 5 attached to said shafts has a whiffletree 6 pivoted thereon. A rigid bolster 7 on said shafts is provided with a series of bolt holes 8, whereby the position may be adjusted to right or left of the king bolt 9 connecting this draft-truck and the shafts to the main part of the machine. This bolt passes also down through the forward end of a forward extending upwardly inclined seat-supporting frame 10, mounted at its rear end on the main axle 11 of the machine and straddling one of the pair of main transporting wheels 12. A seat 13 is supported on the middle part of this frame, which may also serve as a tool box. A depending foot-rest 14, attached to said frame, and also serving as a base board for the corn cutting knife hereinafter described will receive one of the feet of the driver on said seat; his other foot bearing on a broader foot-rest 15, which extends obliquely forward below cross bar 16 of the machine frame from a short longitudinal bar 17 below said seat frame to a point under a longitudinal beam 18 on the other side of the machine parallel with said bar and seat frame and extending nearly as far forward as the latter. The said beam, short bar, cross-bar and seat-supporting frame together constitute nearly all of the main frame of the machine, extending forward from the body of said main frame at one side thereof and its upward inclination above mentioned being sufficient to bring its forward end over the bolster 7 aforesaid. The said beam and cross-bar are lower than the seat frame and to permit this one end of the said cross-bar is bent downward from its point of attachment to the said seat frame, a short post or standard 19 being used to connect the said seat-frame and base board or foot rest 15 at this point. These parts 10, 15, 16, 17, 18 and 19 are all rigidly attached together at every point. Stout clips 20 extend from the rear ends of bar 17 and beam 18 over axle 11 and are indeed parts of the same main frame.

A tilting platform 21 is mounted on the main axle 11 between said seat frame and beam and behind said cross-bar, with the fore-ends of its two longitudinal bars or sills 22 resting on said cross-bar. The raised sides 23 of this platform have flaring upward extensions 24 at the top to guide cornstalks downward and inward as they are thrown back by the man on the seat. An unlocking lever or arm 25 is within easy reach of him and formed with or rigidly attached to a transverse rod or rock-shaft mounted on the tops of the forward ends of sills or bars 22 and provided at its other end with a downwardly and rearwardly bent hook 26, adapted to catch under a rigid lateral pin 27 of beam 18. When said arm 25 extends obliquely forward and said hook is thus engaged the platform is locked in its normal horizontal position, as in Fig. 1. When said arm or lever is lifted, withdrawing the hook from said stud, the platform will still retain this horizontal position if empty or return thereto when emptied, by reason of a slight preponderance of weight in the forward part of said platform; but when full of corn it will readily tilt backward and dump its load immediately on such release. The corn naturally extends back over the rear end of the platform, making its rear end when full the heavier.

To facilitate the discharge of the cut corn, a long transverse roller 28 is journaled in bearings on the rear ends of the sills or bars 22, its top being flush with, or but slightly above, the level of the said platform.

An oblique cutting blade 29 is attached to the under side of broad foot rest 15, its cutting edge extending considerably beyond the latter and being of sufficient length to cross the space between the seat frame and beam 18. A deflector or deflecting wall 31 is raised on the forward part of said beam, rising gradually from front to rear and inclining laterally outward at its rear end, where it is highest. This wall or deflector is in front of the platform and approximately in line with that side wall of the latter which is the more remote from the seat 13. The function of said deflector is to prevent the corn-stalks from falling outside as cut and to direct the slanting corn-stalks inward, also to separate the stalks that are tangled or massed by wind or rain, by being drawn in among the tangled mass and gradually forcing a portion of it upward and inward.

Where the corn stalks have been badly beaten down, a supplemental lifter 32 is often useful. This I secure to the forward end of beam 18 on the inner side thereof, with its point 35 extending slightly outward, so that it will run in under stalks that have fallen out of their proper position and raise them until they are brought within the line of the beam and deflector so as to be cut by the blade. This lifter is not needed with ordinary standing corn, so I fasten it detachably, preferably by a bolt 33 on which it may have a slight pivotal motion. Its upper end is tapered to form a handle 34 and inclined within convenient reach of the occupant of the aforesaid seat. But the said bolt may also be tightened to make said lifter rigid if preferred.

A standard 36 is raised on the seat frame in front of said seat and provided with a hole 37 for convenient attachment of the reins by drawing them through said hole when the driver does not need to hold them but must give his attention to the machine behind.

The operation is as follows: The draft truck being adjusted to the proper position, nearer to or farther from the corn row as preferred, the machine is drawn forward by the animal in the shafts and the blade cuts the corn with an oblique shearing cut. The deflector prevents it from toppling over outside before reaching the platform. When the latter is loaded, the operator frees it as explained and it automatically dumps the corn and resumes its position by the action of gravity as before indicated without stopping the machine or delaying work at all. The blade remains horizontal and the platform, as last above stated, becomes horizontal again also, before the next stalk is cut. Only one man is needed to drive and unlock the tilting platform and the latter works continuously and successfully carrying from 40 to 60 hills to each dump, the former number preferred. The cut corn is dumped in piles at regular intervals in a straight line, so that the work of taking it up and conveying it away is reduced to the minimum.

The entire operation of the machine is automatic except the unlocking motion of the driver when the cart or platform is full, and in some instances a slight operation of the lifter by hand, but usually this last is not at all necessary.

Having thus described my invention, what I claim as new and desire to secure by Letters Patent is:

1. In a corn cutter, the combination of a tilting platform with a horizontal blade fixed obliquely in front of the same and in a plane below it, a transverse rock-shaft or rocking-rod provided with a hook and operating arm, a relatively fixed attachment on the machine frame engaged by said hook and a seat arranged in proximity to the said arm substantially as set forth.

2. In a corn cutter, a tilting platform provided with a roller at its rear end to facilitate the discharge of the load, in combination with means for locking said platform against tilting and unlocking said platform at will and a cutting blade arranged in advance of said platform substantially as set forth.

3. In a corn cutter, a tilting platform, in combination with a cutting blade arranged in advance thereof and a deflector, also in advance of the said platform and on one side of the central longitudinal line of the latter, the rear part of said deflector being inclined rearward and outward laterally substantially as set forth.

4. In a corn-cutter a tilting platform and cutting blade, in combination with a deflector extending forward from one side of the said platform, means for locking said platform against tilting and unlocking the said platform at will, and a lifter provided with a point extending forward and outward laterally from said deflector, for passing between the stalks of fallen corn and raising them, the rear part of said deflector being inclined rearward and outward laterally substantially as and for the purpose set forth.

5. In a corn-cutter, the combination of a tilting corn-receiving platform and a cutting blade, arranged in front thereof, with the main frame of the machine, including a forward extending seat-frame and a seat mounted on seat-frame, a foot-rest depending from said seat and a base-board for said cutter-blade, said base-board being arranged to serve also as a second foot-rest and being rigid with said main frame, said platform resting normally on said main-frame and both said platform and said cutter-blade being arranged across the line of draft substantially as shown.

6. In a corn-cutting machine, the combination of a cutting blade with a tilting platform arranged in the rear of said blade, a deflector extending forward from one side of said platform and having its rear part inclined rearward and outward laterally and a pivoted lifter having its point 35 extended in front of said deflector and provided with a handle substantially as and for the purpose set forth.

7. In a corn cutting machine, the combination of a cutting blade with a tilting platform behind said blade, a deflector extending forward from one side of said platform and tapering forward and downward and a detachable pivoted device attached to the forward end of said deflector and provided with a point for passing between and under fallen corn-stalks substantially as set forth.

8. In a corn-cutting machine, the combination of a main frame, transporting wheels and axle, with a tilting corn-receiving platform pivoted on said axle and resting normally in a horizontal position on said frame and provided with side walls, a cutting blade fixed to said frame and arranged obliquely across the line of draft in front of the said platform and a deflector arranged in front of the said platform and approximately in front of one of the said side walls thereof, the said deflector being inclined upward, rearward and outward laterally, to prevent the corn-stalks from toppling over sidewise out of the machine as cut, substantially as set forth.

9. In combination with a draft truck provided with shafts and a bolster having a transverse series of holes for adjustment, a main frame, including a seat-frame which is rigid with the horizontal body of said main frame but extends upward and forward therefrom, in order that its forward end may be above said bolster, a king-bolt connecting said forward end of the seat-frame to said bolster through any one of the said series of holes at will and a horizontal corn-cutting blade fastened to the said main frame across the line of draft substantially as set forth.

10. In a corn cutter, the combination of a corn receiving platform with a cutting blade arranged in front thereof, a base board for said blade and a seat having a depending foot rest and arranged in proximity to said base board, permitting the latter to be used as a second foot-rest substantially as set forth.

11. In a corn cutter, a horizontal cutting knife, its base-board and a normally horizontal platform behind the same, in combination with a frame having a horizontal part supporting said elements and provided with a seat frame rigidly attached thereto and extending upward and forward, and a seat supported on said seat frame in proximity to said base board, in order that the latter may be used as a foot rest substantially as set forth.

In testimony whereof, I have signed my name to this specification in the presence of two subscribing witnesses.

JOHN SCHAUBER.

Witnesses:
  W. Scott Roberts,
  Wm. L. Hatton.